US007671352B2

(12) United States Patent
Loew

(10) Patent No.: US 7,671,352 B2
(45) Date of Patent: Mar. 2, 2010

(54) FILM SCANNER AND DETECTION APPARATUS THEREFOR

(75) Inventor: Andreas Loew, Gross-Gerau (DE)

(73) Assignee: DFT Digital Film Technology Holding GmbH, Weiterstadt (DE)

( * ) Notice: Subject to any disclaimer, the term of this patent is extended or adjusted under 35 U.S.C. 154(b) by 336 days.

(21) Appl. No.: 11/899,904

(22) Filed: Sep. 6, 2007

(65) Prior Publication Data

US 2008/0067395 A1 Mar. 20, 2008

(30) Foreign Application Priority Data

Sep. 14, 2006 (DE) ....................... 10 2006 043 956

(51) Int. Cl.
*G01N 21/86* (2006.01)
*H04N 5/253* (2006.01)

(52) U.S. Cl. ............................ 250/559.09; 250/559.42; 348/97

(58) Field of Classification Search ............ 250/559.42, 250/559.09, 559.29, 559.4; 348/97–106; 352/38

See application file for complete search history.

(56) References Cited

U.S. PATENT DOCUMENTS 2,420,798 A 5/1947 Shepherd
2,769,028 A 10/1956 Webb
4,104,680 A 8/1978 Holland
4,737,649 A * 4/1988 Naruse .................. 250/559.11
4,855,836 A 8/1989 Shearer
4,906,854 A * 3/1990 Rauh et al. ............. 250/559.36
5,194,958 A * 3/1993 Pearman et al. ............... 348/97
5,229,620 A * 7/1993 Pahr ...................... 250/559.36
5,389,795 A * 2/1995 Rye ...................... 250/559.42
5,666,199 A * 9/1997 Hess et al. .................. 356/364
5,734,171 A * 3/1998 Witte .................... 250/559.02
5,760,414 A * 6/1998 Taylor ................... 250/559.42
5,969,372 A * 10/1999 Stavely et al. .......... 250/559.42
6,157,438 A * 12/2000 Kaus ........................... 355/41
6,816,604 B2 11/2004 Young, Jr. et al.
2008/0067395 A1* 3/2008 Loew ......................... 250/393

FOREIGN PATENT DOCUMENTS

DE 69118059 8/1990
DE 19731530 7/1997
DE 19731531 7/1997
DE 19813126 3/1998

* cited by examiner

*Primary Examiner*—John R Lee
(74) *Attorney, Agent, or Firm*—Henry M. Feiereisen; Ursula B. Day

(57) ABSTRACT

A detection apparatus for detecting perforation holes of a cinematographic film comprises at least one light source, at least one scanning sensor, which is arranged so as to receive light emitted by the light source after interaction with a perforation zone of the film, and an evaluation circuit for detecting, by means of an output signal of the scanning sensor, when an edge of a perforation hole passes through between light source and scanning sensor. The light source emits light which is polarized with a first polarization and the scanning sensor is sensitive selectively to light with a second polarization.

19 Claims, 4 Drawing Sheets

FILM SCANNER AND DETECTION APPARATUS THEREFOR

This application claims the benefit, under 35 U.S.C. § 119 of German Patent Application 102006043956.2, filed 14 Sep. 2006.

FIELD OF THE INVENTION

The present invention relates to a film scanner for scanning a cinematographic film and converting its images into a video signal and to a detection apparatus for detecting perforation holes of the film for use in such a film scanner.

BACKGROUND OF THE INVENTION

A film scanner, as described, for example, in DE 197 31 531 B4, comprises a sensor arrangement for scanning, in a spatially resolving manner, an image zone of the film, such as an arrangement of CCD line sensors, and also driving means which move the film past the sensor arrangement at a controlled speed. During the conversion into a video signal, each image must be converted into a predetermined number of lines of the video signal. Conventionally, the CCD line arrangement is actuated for this purpose using synthetically produced pulses, of which each pulse triggers the scanning of a line, in order thus to scan the specified number of lines within that time period in which an image moves past the sensor arrangement. To this end, the transport speed of the film must be synchronized exactly with the scanning frequency.

In order to produce and maintain such a synchronization, advantage is taken of the fact that the holes of the edge perforation, to be more precise the "Mitchell hole", represent an exact reference for the position of the images on the film, and a detection apparatus for detecting the perforation holes is used, comprising a light source, a scanning sensor, which is arranged so as to receive light emitted by the light source and transmitted by a perforation zone of the film, and an evaluation circuit for detecting, by means of ah output signal of the scanning sensor, when an edge of a perforation hole passes through between light source and scanning sensor.

This conventional detection apparatus takes advantage of the fact that each time a perforation hole edge passes through the beam path from the light source to the scanning sensor, the light intensity arriving at the scanning sensor experiences a temporary dip. This dip is caused by a change in material occurring in the region of the perforation hole edges during stamping of the perforation holes. In general, such a change negatively affects the mechanical strength of the film material and, with prolonged use, can lead to tearing of the perforation. It is therefore inherently desirable to keep material changes during stamping of the perforation as small as possible. The smaller these material changes are, the weaker, however, is the dip of the light intensity detected by the known detection apparatus when a perforation edge passes through. The weaker the detected dip is, the more difficult it is to distinguish it from fluctuations of the light intensity detected by the scanning sensor which are caused in other ways. Thus the detection of the perforation edges becomes unreliable and imprecise.

SUMMARY OF THE INVENTION

It is therefore the object of the present invention to provide a detection apparatus for detecting perforation holes of a cinematographic film, which enables the exact detection of perforation edges providing a large signal-to-noise ratio.

The object is achieved in a detection apparatus for detecting perforation holes of a cinematographic film, with at least one light source, at least one scanning sensor, which is arranged so as to receive light emitted by the light source after interaction with a perforation zone of the film, and an evaluation circuit for detecting, by means of an output signal of the scanning sensor, when an edge of a perforation hole passes through between light source and scanning sensor, by the light source emitting light which is polarized with a first polarization and by the scanning sensor being sensitive selectively to light with a second polarization.

If both polarizations are identical, in particular if the polarizations are parallel linear, the light intensity detected away from a perforation edge by the polarization-sensitive scanning sensor does not differ from that which would be detected using a conventional, non-polarization-sensitive sensor. If, however, a perforation edge is located in the beam path, one proportion of the light, which alters its polarization state at the perforation edge, is not detected by the polarization-sensitive sensor. As a consequence, the intensity dip detected by the polarization-sensitive sensor is stronger than that detected using a conventional, non-polarization-sensitive sensor, with the result that the detection of the perforation edge is possible with a larger signal-to-noise ratio and consequently with a higher accuracy.

Alternatively, it can be expedient if the first and the second polarization are orthogonal, in particular orthogonal linear polarizations. In such a case, the light intensity detected by the scanning sensor without a perforation edge present is always zero (or, in the case of stress birefringence in the material of the film, near zero), whereas when a perforation edge is present, a proportion of the light whose polarization has altered at the edge is detected by the scanning sensor. Since in this configuration the output signal fed by the scanning sensor is nearly free of background noise and/or background signal, a low intensity of the light detected by the scanning sensor suffices to achieve a large signal-to-noise ratio and a correspondingly exact measurement.

In order not to negatively affect a simultaneous scanning of an image adjacent to the perforation holes, the light source preferably emits light outside the visible spectral range evaluated during the scanning of the images.

Typically, a plurality of perforation holes are associated with each image of the film, of which only one, the so-called "Mitchell hole", has served as a reference for positioning the image on the film and thus offers the most exact reference for scanning it. In order that the detection apparatus indicates in each case only the detection of the Mitchell holes for consecutive images, the evaluation circuit can be provided with a counter for counting the passages of perforation hole edges and be designed to feed an output signal indicating the detection of a reference perforation hole in each case after a predefined number of passages have been detected.

Such a counter can lose synchronization if perforation edges are damaged on account of perforation damage, or are missing altogether, and therefore cannot be detected correctly during the transport of the film. This problem can be alleviated by a blanking circuit for deactivating the evaluation circuit for a predetermined period of time after each reference perforation hole has been detected. If this blanking circuit deactivates the evaluation circuit after a reference perforation hole has been detected for a period of time with a length such that the next perforation edge detected subsequently is associated again with a reference perforation hole, damaged perforations which are not associated with a reference perforation hole can no longer interfere with the detection.

Another possibility to reduce the likelihood of detection errors is to provide the detection apparatus with at least two spaced apart scanning sensors, wherein the evaluation circuit is designed to detect the passage of an edge of a perforation hole by logic combination of the output signals of the scanning sensors. These at least two scanning sensors can be arranged so as to detect the edge of the same perforation hole at different places; they can be arranged at different perforation holes of the same perforation zone or else at different perforation zones on both sides of an image zone of the film.

If two scanning sensors, which are spared apart at an angle to the film transport direction, are present, these can also be used to detect an oblique position of the film using a time offset between output signals of the scanning sensors.

In that case, the at least two scanning sensors are preferably arranged at two different perforation zones of the film.

Another subject matter of the invention is a film scanner with a sensor arrangement for scanning an image zone of the film and a detection apparatus for detecting perforation holes of the film as defined above.

BRIEF DESCRIPTION OF THE DRAWINGS

Further features and advantages of the invention follow from the description of exemplary embodiments below with reference to the attached figures, in which.

DETAILED DESCRIPTION OF PREFERRED EMBODIMENTS

Figure 1:
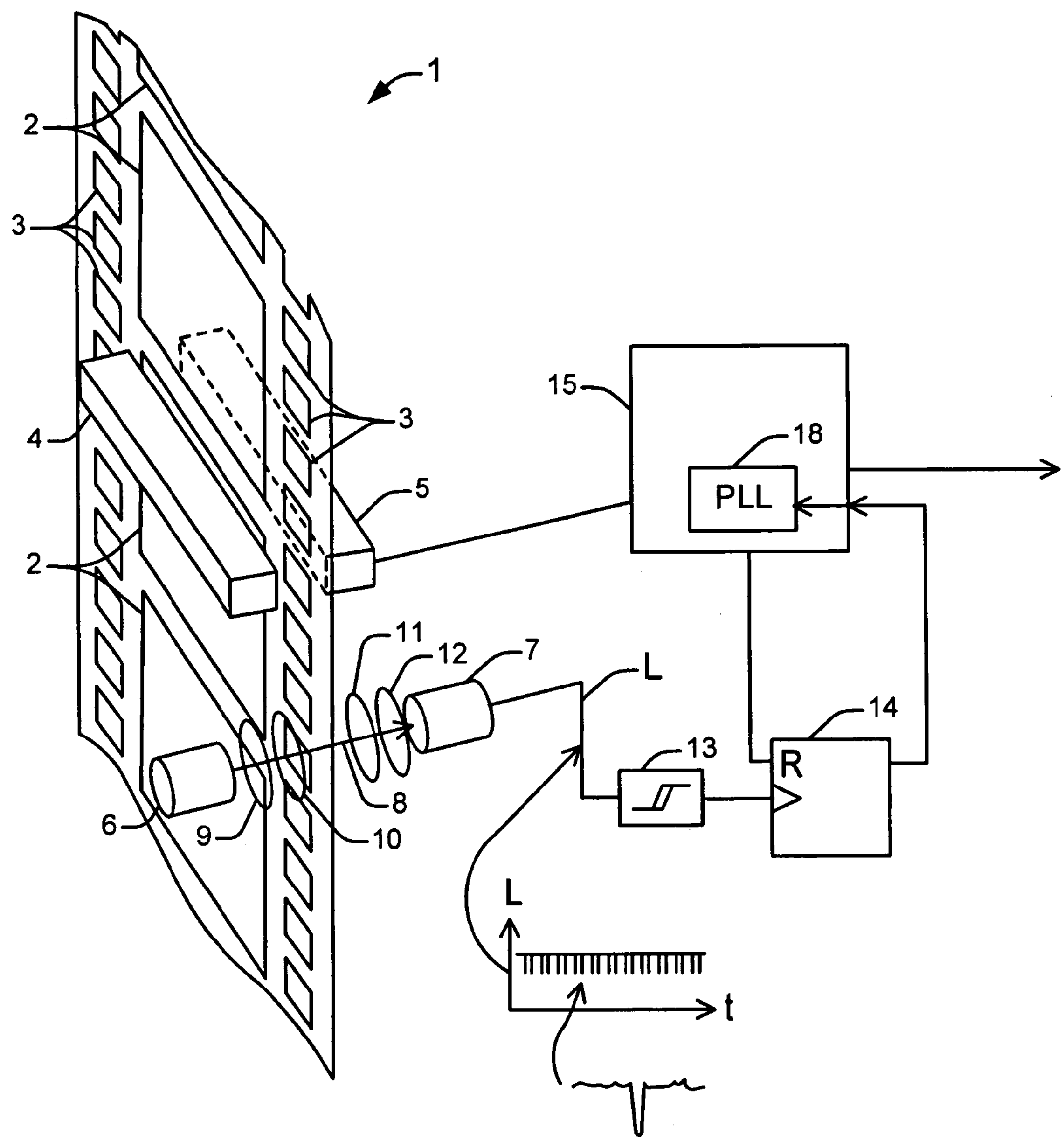
FIG. 1 shows a block diagram of those parts of a film scanner according to a first configuration of the invention which are essential to the present invention.

FIG. 1 shows a film to be scanned designated as 1, images, positioned in a central zone of the film 1 as 2 and perforation holes formed in two edge zones of the film 1 as 3. On both sides of the central zone, a light source 4 and a sensor line 5 for scanning the images 2 are located such that they face each other. Means for transporting the film 1 through between light source 4 and sensor line 5 and the design of the sensor line 5 itself can be of any known type, in particular as described in DE 197 31 531 B4, and are not explained here in detail, as this is not necessary to understand the invention.

A detector assembly is arranged at one of the edge zones upstream of the sensor line 5 in the transport direction of the film 1 (from the bottom upwards in FIG. 1). This detector assembly comprises an infrared-light source 6, such as a laser diode, an infrared scanning sensor 7 facing the infrared-light source 6 on the other side of the film 1, and sequentially in the path of a light beam 8 from the light source 6 to the scanning sensor 7 a polarizer 9, a converging lens 10, another converging lens 11 and an analyser 12. The first converging lens 10 focuses the light beam 8 in the plane of the film 1; the second one focuses the light beam 8 onto the scanning sensor 7. Polarizer 9 and analyser 12 have arbitrary parallel polarization planes.

If the light beam 8 passes through a perforation hole 3 or a piece of the film 1 which is spaced apart from the edges of the perforation holes 3, the polarization established by the polarizer 9 does not change, and the light beam 8 passes through the analyser 9 substantially without having been weakened. If, however, the light beam 8 strikes an edge of a perforation hole 3, a component of the beam 8 is scattered diffusely. In the process, not only the direction changes, but also the polarization plane of the light. A small component of the light, which is deflected to such a strong degree that it is no longer incident on the converging lens 11, is no longer captured by the sensor 7, irrespective of its polarization. More weakly deflected proportions of the light, which are still incident on the converging lens 11, are attenuated in the analyser 12 on account of their altered polarization plane. An output signal L, which is proportional to the received light intensity, of the sensor 7 thus has a progression as a function of time t as illustrated in the figure as inserted diagram. Phases with a noisy high level which remains the same on average are separated by temporary dips which each correspond to the passage of a perforation edge between light source 6 and scanning sensor 7. Since the dips are lower than in the case of a corresponding arrangement without polarizer 9 or analyser 12, the temporal position of the dips, and thus the time of the passage of the perforation edge between light source 6 and sensor 7, can be detected with increased accuracy.

It is furthermore desirable, for exact detection of the temporal position of the dips, for the latter to be of short duration. This can be achieved by means of sharp focussing of the light beam 8 in the plane of the film.

Such a sharp focussing can in particular be achieved using a coherent light beam 8 of low transverse mode, as can be achieved using a laser as light source 6.

Furthermore, the shorter its wavelength, the more narrowly can the beam 8 be focussed. It can therefore be expedient to use a laser diode with a shorter wavelength than the above-mentioned IR laser diode. Since a laser diode emitting within the visible spectral range as light source 6 could interfere with the image scanning at the sensor line 5 on account of scattered light, such a shorter wavelength should expediently lie within the ultraviolet spectral range.

According to a modification, the polarization planes of polarizer 9 and analyser 12 are oriented at right angles to one another. Light passing through a perforation hole 3 or film material spaced apart from an edge of a perforation hole 3 maintains its polarization and is suppressed in the analyser 12. Only light which experiences a change in polarization at a hole edge can pass through the analyser 12 and arrives at the scanning sensor 7. The output signal of the scanning sensor 7 thus predominantly exhibits zero level; a short pulse is registered only while a perforation hole edge passes through between light source 6 and sensor 7.

Connected to the output of the scanning sensor 7 is a discriminator, for example a Schmitt trigger 13, which outputs a standard counting pulse to a frequency divider 14 for each intensity dip in the case of parallel orientation of polarizer 9 and analyser 12 (or for each pulse in the case of their orthogonal orientation). The frequency divider 14 is a counter which outputs one pulse for in each case eight pulses received from the discriminator 13. Said pulse is fed to a synchronisation input of a converter circuit 15 connected to the sensor line 5 in order to convert colour and brightness values detected by the sensor line 5 into a video signal. The frequency divider 14 takes advantage of the fact that exactly four perforation holes 3 in one of the two edge zones correspond to each image 2 of the film 1, with the result that in each case eight counting pulses output by the discriminator 13 correspond to the passage of an image 2 through the scanner.

Typically, of the four perforation holes 3 adjacent to an image 2, the first one in the transport direction, referred to as Mitchell hole, is used as reference for the positioning of the subsequent image 2. The frequency divider 14 is thus expediently synchronized such that it feeds a reference pulse to the converter circuit 15 at the exact point when a perforation edge detected by the scanning sensor 7 is associated with a Mitchell hole. Such synchronization can be achieved, for example, if, at the beginning of the film transport through the scanner, the converter circuit 15 transmits a reset pulse to the counter 14 if the sensor line 5 detects a gap between two images 2.

The converter circuit 15 comprises an oscillator, which can be designed for example in the form of a PLL control loop 18 and prescribes the frequency with which the converter circuit 15 interrogates the sensor line 5 in order to produce an image line of the video signal in each case. By synchronizing the frequency of said oscillator 18 with the reference pulses from the frequency divider 14, it is ensured that from each image 1, the number of lines, which corresponds to the video signal standard used, are scanned with constant distance.

Alternatively, it is also possible to operate the converter circuit 15 with a fixed-frequency oscillator and, instead, to utilize the reference pulses of the frequency divider 14 to match the transport speed of the film to the fixed line frequency of the converter circuit 15.

Figure 2:
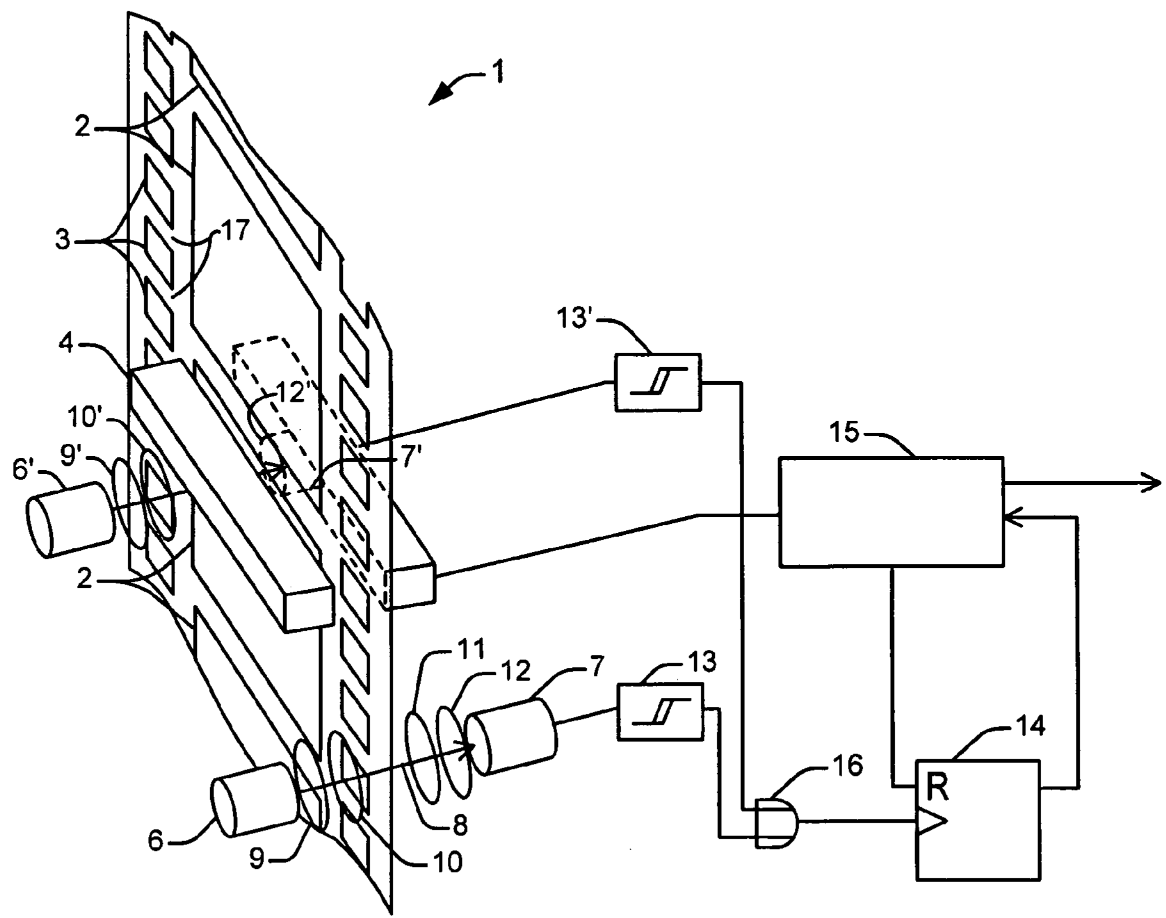
FIG. 2 shows a diagram which is analogous to FIG. 1 according to a first developed configuration.

FIG. 2 shows a developed configuration of the scanner, in which a second detector assembly, of the same design as the above-described detector assembly, with light source 6', sensor 7', polarizer 9', lenses 10', 11' and analyser 12' is arranged at the second edge zone of the film 1. As explained above, it is also possible here to orient polarizer 9' and analyser 12' such that they are parallel or orthogonal. A discriminator 13, 13' is connected downstream of each of the two scanning sensors 7, 7". Outputs of both discriminators 13, 13' are connected to the counting input of the counter 14 via an OR gate 16. If in one of the edge zones of the film 1 the perforation is damaged and a web 17 is missing between adjacent perforation holes 3, the hole edges in the respectively other edge zone are nevertheless detected correctly and counted by the counter 14. Thus, in the case of perforation damage on one side, the synchronization of the reference pulse with the Mitchell holes is not lost.

It is also possible for a sensor line, which is oriented at an angle to the film transport direction and whose sensors each detect independently of one another the passage of the very same perforation hole edge, to be provided rather than a single scanning sensor 7 or 7'. The multiplicity of signals supplied by these sensors can be utilized in different ways in an evaluation circuit replacing the discriminators 13 and the OR gate 16. It is possible to obtain an averaged signal with reduced noise component from the multiplicity of sensor output signals, which permits more reliable detection of the intensity dips or peaks. Alternatively, the sensor output signals can each be examined individually as to whether or not they indicate a perforation edge passage, with the evaluation circuit assuming that a perforation edge has indeed been detected and feeding a corresponding counting pulse to the counter 14 if the output signals of at least a predefined minimum number of sensors indicate such an edge passage. It is also possible to ascertain the times of the edge passage individually for the plurality of sensors and to decide whether these times exhibit a tendency which increases or decreases in the direction of width of the film. If this is the case, it indicates an oblique position of the film 1 which can be taken into consideration when controlling the film transport or when converting the image information scanned by the sensor line 5 into the video signal.

Figure 3:
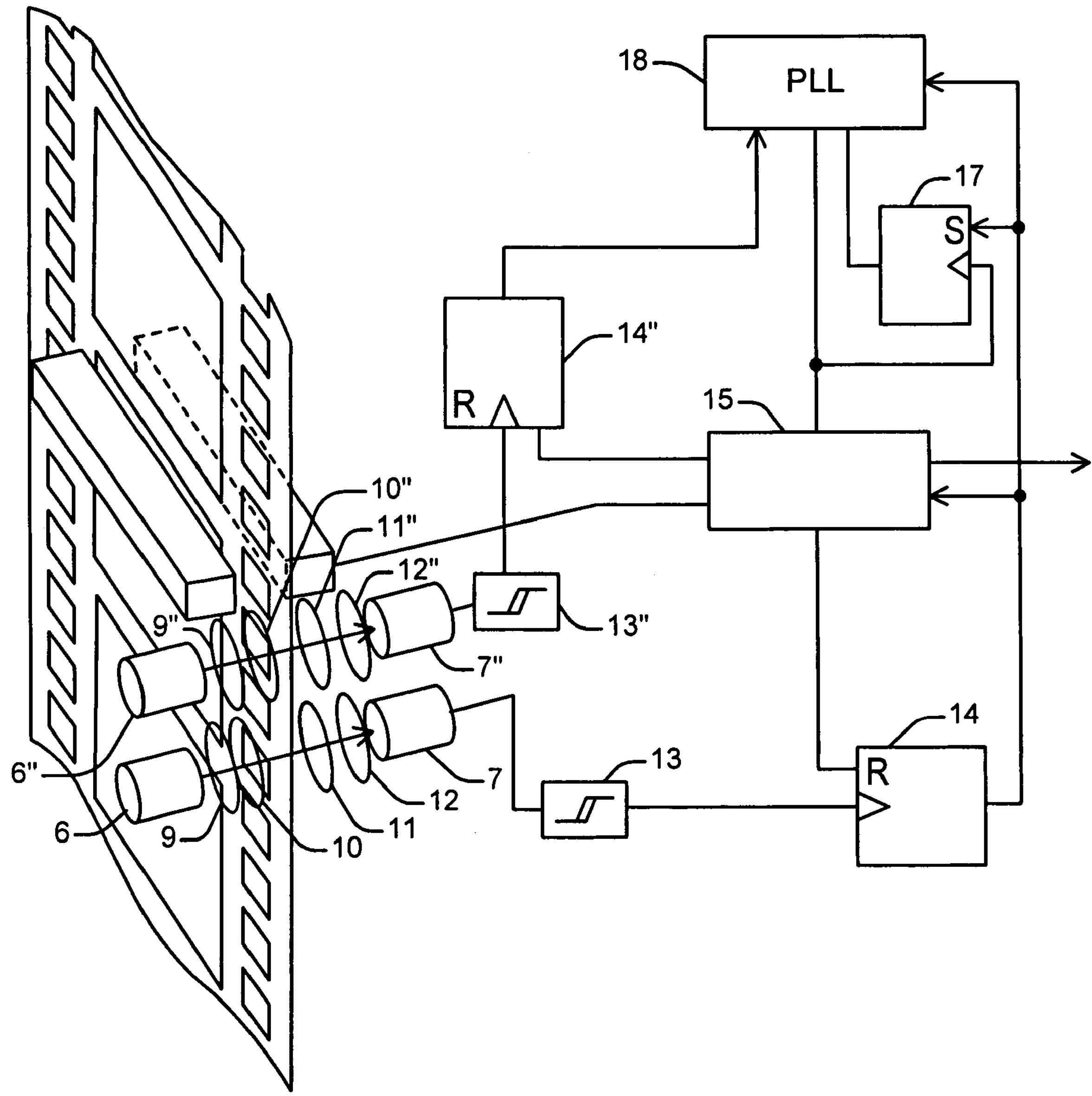
FIG. 3 shows a diagram which is analogous to FIG. 1 according to a second developed configuration.

A second developed configuration is illustrated in FIG. 3. It differs from the scanner of FIG. 1 by virtue of a second detector assembly with infrared-light source 6", polarizer 9", lenses 10", 11", analyser 12" and scanning sensor 7", which detector assembly is arranged at the same edge zone of the film 1 as the assembly with the scanning sensor 7. The distance between the two assemblies approximately corresponds to half the image width in the direction of film transport. Connected to the output of the scanning sensor 7" via a discriminator 13" is a 1:8 frequency divider 14" which is synchronized like the frequency divider 14 by the converter circuit 15 in order to output a reference pulse each time a Mitchell hole is detected. A counter 17 has a set input connected to the frequency divider 14 and a counting input connected to a line pulse signal of the PLL control loop 18 and, each time a reference pulse is received from the counter 14, begins to count line pulses of the PLL control loop 18 starting at a predefined start value. This start value is predefined in correspondence with the distance between the two assemblies such that, once the frequency of the line pulses is perfectly matched with the film transport speed, the counter 17 has the value zero at that time when the frequency divider 14" outputs a reference pulse to the PLL loop 18. The PLL loop 18 receives a correction variable which is representative of the deviation of the line frequency of the PLL loop 18 from the optimum value by said PLL loop reading the content of the counter 17 when a reference pulse from the frequency divider 14" is received. In effect, a correction of the line frequency is possible twice per scanned image, once using the reference pulse from the frequency divider 14 and once using the counting value of the counter 17.

Figure 4:
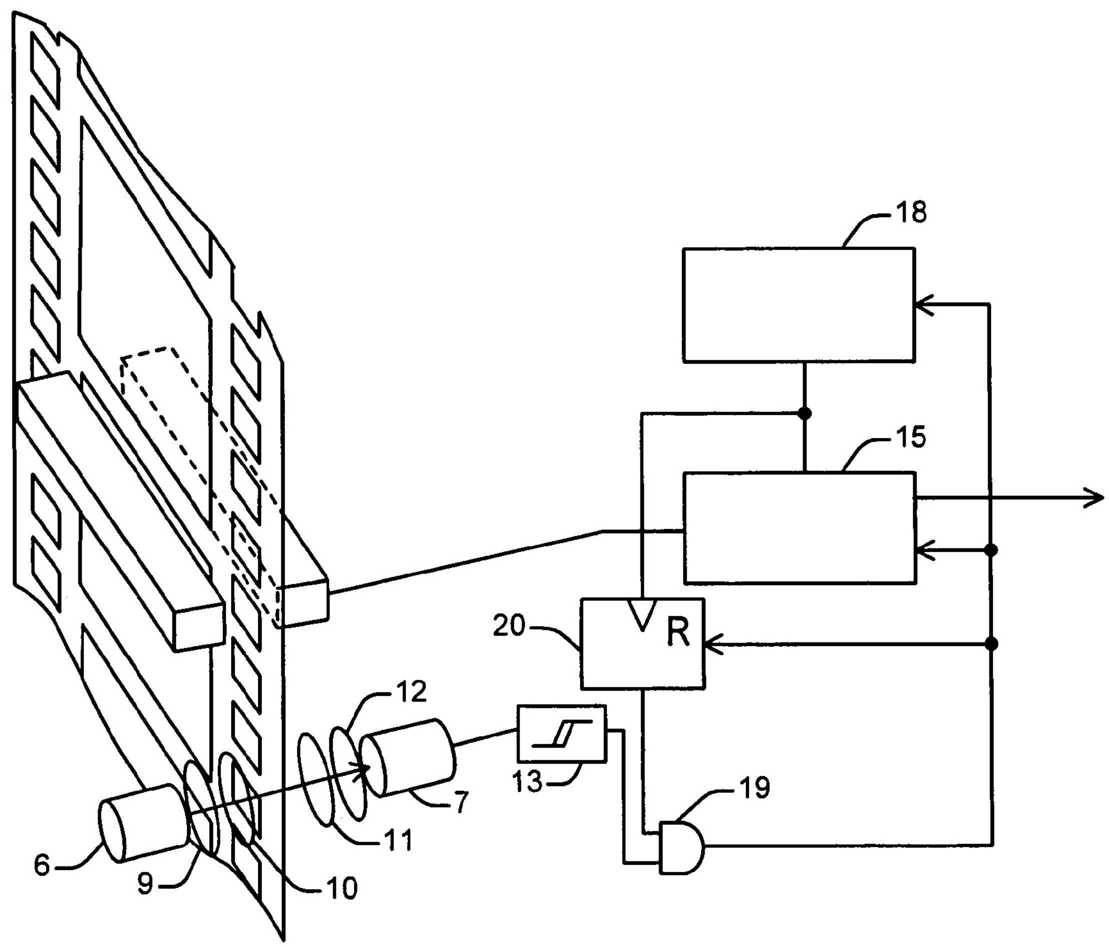
FIG. 4 shows a diagram which is analogous to FIG. 1 according to a third developed configuration.

A third development is shown in FIG. 4. This modification differs from the configuration of FIG. 1 by an AND gate 19, of which one input is connected to the discriminator 13 and its output is connected to a reference pulse input of the converter circuit 15 rather than the frequency divider 14 (not present here). A second input of the AND gate 19 is connected to the line pulse output of the PLL control loop 18 via a counter 20. The counter 20 has a reset input connected to the output of the AND gate 19. The output signal of the counter 20 is logic zero as long as its counting value lies below a preset limit value which is greater than ⅞ of the line number and less than the line number of the video signal produced in the converter circuit 15. If the limit value is exceeded, the output signal assumes the value 1, with the result that a passage of a perforation edge detected at this time by the detector assembly leads to the output of a reference pulse at the output of the AND gate 19. This reference pulse is used, as in the configuration of FIG. 1, to synchronize the converter circuit 15 or its PLL control loop 18; the fact that it additionally resets the counter 20 means that the next seven perforation passages in the AND gate are suppressed

What is claimed is:

1. A detection apparatus for detecting perforation holes of a cinematographic film, with at least one light source, at least one scanning sensor, which is arranged so as to receive light emitted by the light source after interaction with a perforation zone of the film, and an evaluation circuit for detecting, by means of an output signal of the scanning sensor, when an edge of a perforation hole passes through between light source and scanning sensor, wherein the light source emits light which is polarized with a first polarization and the scanning sensor is sensitive selectively to light with a second polarization.

2. The detection apparatus of claim 1, wherein the first and the second polarization are parallel linear polarizations.

3. The detection apparatus of claim 1, wherein the first and the second polarization are orthogonal linear polarizations.

4. The detection apparatus of claim 1, wherein the light source emits light outside the visible spectral range.

5. The detection apparatus of claim 1, wherein the evaluation circuit comprises a counter for counting the passages of perforation hole edges and is designed to feed an output signal indicating the detection of a reference perforation hole after a predefined number of passages have been detected.

6. The detection apparatus of claim 1, wherein a blanking circuit is provided for deactivating the evaluation circuit for a predetermined period of time after a reference perforation hole has been detected.

7. The detection apparatus of claim 1, wherein it has at least two spaced apart scanning sensors and the evaluation circuit is designed to detect the passage of an edge of a perforation hole by logic combination of the output signals of the scanning sensors.

8. The detection apparatus of claim 1, comprising at least two scanning sensors, which are spaced apart at an angle to the film transport direction, and designed to detect an oblique position of the film using a time offset between output signals of the scanning sensors.

9. The detection apparatus according to claim 8, wherein the at least two scanning sensors are arranged at two different perforation zones of the film.

10. A film scanner with a sensor arrangement for scanning an image zone of the film and a detection apparatus according to one of the preceding claims.

11. A method for detecting perforation holes of a cinematographic film, including the steps of:

illuminating a perforation zone of the film containing the perforation holes by means of a light source emitting light of a first polarity;

receiving the light having the first polarity after interaction with the perforation zone of the film by means of a sensor having a sensitivity selective to light with a second polarisation; and issuing an output signal when an edge of a perforation hole passes through between the light source and the sensor.

12. The method of claim 11, wherein the first and the second polarisation are of linear type and are either orthogonal or parallel to each other.

13. The method of claim 11, wherein the light source emits light in a spectrum outside the visible range.

14. The method of claim 11, further comprising the steps of counting the number of passages of perforation hole edges and indicating the detection of a reference perforation hole after a predetermined number of passages has been detected.

15. The method of claim 14, further including the step of deactivating the counting of the number of passages for a predetermined time interval after a reference perforation hole has been detected.

16. The method of claim 11, including detecting perforation holes at two spaced apart locations and logically combining the respective output signals.

17. The method of claim 16, including performing the detection at the two spaced apart positions at an angle to the film transport direction, and evaluating a time offset between the output signals obtained at the spaced apart locations.

18. The method of claim 16, including locating the two spaced apart positions at two different perforation zones of the film.

19. Film scanner arranged to perform the method of claim 11.

* * * * *